US 10,412,609 B2

United States Patent
Andersson et al.

(10) Patent No.: US 10,412,609 B2
(45) Date of Patent: *Sep. 10, 2019

(54) HANDLING OF TRANSPORT CONDITIONS

(71) Applicant: TELEFONAKTIEBOLAGET LM ERICSSON (PUBL), Stockholm (SE)

(72) Inventors: Markus Andersson, Boden (SE); Bo Burman, Upplands Väsby (SE); Göran Eriksson, Norrtälje (SE); Magnus Westerlund, Upplands Väsby (SE)

(73) Assignee: TELEFONAKTIEBOLAGET LM ERICSSON (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/938,294

(22) Filed: Mar. 28, 2018

(65) Prior Publication Data

US 2018/0220315 A1 Aug. 2, 2018

Related U.S. Application Data

(63) Continuation of application No. 15/035,078, filed as application No. PCT/SE2013/051320 on Nov. 8, 2013, now Pat. No. 9,936,406.

(51) Int. Cl.
*H04W 24/08* (2009.01)
*H04L 12/24* (2006.01)
(Continued)

(52) U.S. Cl.
CPC ......... *H04W 24/08* (2013.01); *H04L 41/0896* (2013.01); *H04L 41/12* (2013.01);
(Continued)

(58) Field of Classification Search
CPC .... H04W 24/08; H04L 41/0896; H04L 41/12; H04L 43/062
See application file for complete search history.

(56) References Cited

U.S. PATENT DOCUMENTS

2003/0110293 A1 6/2003 Friedman et al.
2008/0049626 A1 2/2008 Bugenhagen et al.
(Continued)

OTHER PUBLICATIONS

International Search Report and Written Opinion dated Jun. 24, 2014, in International Application No. PCT/SE2013/051320, 12 pages.
(Continued)

*Primary Examiner* — Wei Zhao
(74) *Attorney, Agent, or Firm* — Rothwell, Figg, Ernst & Manbeck, P.C.

(57) ABSTRACT

A network information system for determining transport conditions in a communications network. Monitoring data is acquired from a plurality of data transport nodes in a communications network. Transport conditions are determined from network information related to transport flows for network transmission of real time media flows. The network information is determined from a subset of the acquired monitoring data. The determined transport conditions are provided to at least one of a network connected device running an application involving the network transmission of real time media flows and a data transport node involved in the network transmission of real time media flows.

29 Claims, 3 Drawing Sheets

(51) Int. Cl.
   *H04L 12/26* (2006.01)
   *H04L 29/06* (2006.01)

(52) U.S. Cl.
   CPC ........ *H04L 41/5003* (2013.01); *H04L 43/062* (2013.01); *H04L 43/0852* (2013.01); *H04L 43/0876* (2013.01); *H04L 43/0882* (2013.01); *H04L 65/80* (2013.01); *H04L 41/0893* (2013.01); *H04L 43/12* (2013.01)

(56) References Cited

U.S. PATENT DOCUMENTS

| | | | |
|---|---|---|---|
| 2010/0008245 A1 | 1/2010 | Viger et al. | |
| 2011/0058479 A1* | 3/2011 | Chowdhury | H04L 45/04 370/237 |
| 2014/0098671 A1* | 4/2014 | Raleigh | H04L 69/14 370/235 |
| 2016/0186533 A1* | 6/2016 | Donzier | E21B 37/06 702/6 |

OTHER PUBLICATIONS

Hong "Tu18: Internet Traffic Monitoring and Analysis: Methods and Applications" GLOBECOM 204, IEEE, 63 pages.

\* cited by examiner

HANDLING OF TRANSPORT CONDITIONS

CROSS-REFERENCE TO RELATED APPLICATIONS

This application is a continuation of U.S. application Ser. No. 15/035,078, having a section 371(c) date of May 6, 2016 (published as US 2016/0277953), which is a national stage of International Patent Application no. PCT/SE2013/051320, filed on Nov. 8, 2013. The above identified applications and publication are incorporated by this reference.

TECHNICAL FIELD

Embodiments presented herein relate to a communications network, and particularly to a method, a network information system, a computer program, and a computer program product for determining transport conditions in a communications network.

BACKGROUND

In communication networks, there is always a challenge to obtain good performance and capacity for a given communications protocol, its parameters and the physical environment in which the communication network is deployed.

Existing real-time audio-visual communication services, including the 3GPP (3rd Generation Partnership Project) technical standard TS 26.114 (MTSI; Multimedia Telephony Service for Internet Protocol Multimedia Subsystem) and the profile called IR.94 in GSMA (the Global System for Mobile Communications Association), use SIP/SDP (Session Initiation Protocol/Session Description Protocol) as signaling to configure and setup a call between two user equipment (UE), and use the Internet Protocol (IP), the User Datagram Protocol (UDP) and the Real-time Transport Protocol (RTP) to encapsulate a (compressed representation of) media data during transport, on top of any chosen physical transport medium.

One approach to handle service and mobile broadband (MBB) transport is to configure an application run on a connected device to use a constant bitrate and to configure and dimension the transport resources to, with a sufficiently high probability, provide the needed resource.

Another approach is to configure the application to adapt to changing transport prerequisites in the media end point devices (i.e., at connected devices). This adaptation could be based on measurements in the end points and service specific implementations that perform the adaptation. The adaptation may include stopping the transmission of media components, such as the video component. For instance, for the GSMA Voice over Long Term Evolutional (VoLTE), Open Mobile Alliance (OMA) Device Management mechanism is intended to be used to provision a start bit rate to be used by the video coder application of a connected device.

In general terms, the user experience of services involving real time media, such as speech and conversational video, in a communications environment with constrained transport resources, such as in a public mobile broadband cell, is negatively impacted by packet loss, jitter and possibly packet reordering. Developing and configuring the service to adapt to varying transport prerequisites may be challenging, especially when channel conditions are subject to rapid, sporadic changes.

Providing the network developer and network service provider with tools for managing this uncertainty by exposing explicit information is one approach for providing a better user experience. Approaches based on having a constant bit rate may not be able to utilize the capacity available in a heterogeneous transport network; the maximum bitrate used is set according the lowest expected capability.

Further, transport conditions in a mobile broadband cell may be changing so fast that an end point device cannot detect changes as they occur. Also, the change itself may not be easily predictable. The transmission capacity of the wireless link for a particular user and radio bearer varies. The actual maximum transmission capacity may only be determined by having a standing queue for the radio scheduler scheduling packets of the user and radio bearer. In general terms, a standing queue is equivalent to delay, which is undesirable for a real-time application.

Further, IP protocols do not give any indication regarding how under-utilized the currently available capacity for a flow is. The amount of network traffic must be quickly increased to successfully probe after available capacity when no signs of over-utilization are present. When this rapid increase of network traffic reaches the actual capacity limit of the network a significant overshot may occur due to the delay in the network. In such cases a significant queue, and thus one-way delay, will be built up in the network, thus reducing the user experience of the service. At least these reasons may make it difficult to deploy probing, thus preventing the end point device to adapt in pace with the changing network conditions.

Current End-to-End algorithms, even if performing predictions, such as the Sprout transport protocol may only observe the network traffic flows to and from individual UEs and are not capable of registering or predicting the impact from other UEs, including mobility events in and out from each cell.

Another issue is that when the application is temporarily limited in the amount of data it wants to send, the network is, below its available capacity limit, not enough excited to produce any signals from which current and future behavior can be predicted from.

In conclusion, the above disclosed methods to estimate available network capacity makes it hard to accurately match actually available network capacity to the needed capacity at the media sender, leading to bad QoE, such as for example one or more of lower-than-necessary media quality due to under-utilization of available capacity resources, loss of media data due to over-use of capacity resources, delay and delay variation due to (long or short-term) over-use of capacity resources.

Hence, there is still a need for providing improved network information in a communications network.

SUMMARY

An object of embodiments herein is to provide improved network information in a communications network.

The inventors of the enclosed embodiments have through a combination of practical experimentation and theoretical derivation discovered that more accurate information about available capacity would be needed by any media sender that can control the produced bitrate. This "media sender" may or may not be the original source of the media.

According to a first aspect there is presented a network information system (NIS) for determining transport conditions in a communications network. The NIS comprises a first functional module. The first functional module is arranged to acquire monitoring data from a plurality of data transport nodes in a communications network. The NIS comprises a second functional module. The second functional module is arranged to determine transport conditions from network information related to transport flows for network transmission of real time media flows. The network information is determined from a subset of the acquired monitoring data. The NIS comprises a third functional module. The third functional module is arranged to provide the determined transport conditions to at least one of a network connected device running an application involving the network transmission of real time media flows and a data transport node involved in the network transmission of real time media flows.

Advantageously this provides improved network information in a communications network.

Advantageously the NIS is operable as a real-time service to provide an improved user experience for users of connected devices.

Advantageously this provides determination of accurate start-up bitrates and packet loss values to correctly configure encoders and redundancy mechanisms.

Advantageously this provides timely indications of changes in available bitrate that would be difficult for any end-to-end adaptation to handle without incurring loss of packets, reduced quality, etc. or increased delay between the sender and the receiver of real time media flows.

Advantageously this enables quick and accurate increases in bitrate as the amount of available bitrates increases.

According to a second aspect there is presented a method for determining transport conditions in a communications network. The method comprises acquiring monitoring data from a plurality of data transport nodes in a communications network. The method comprises determining transport conditions from network information related to transport flows for network transmission of real time media flows, the network information being determined from a subset of the acquired monitoring data. The method comprises providing the determined transport conditions to at least one of a network connected device running an application involving the network transmission of real time media flows and a data transport node involved in the network transmission of real time media flows.

According to a third aspect there is presented a computer program for determining transport conditions in a communications network, the computer program comprising computer program code which, when run on a network information system (NIS), causes the NIS to perform a method according to the second aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1A:
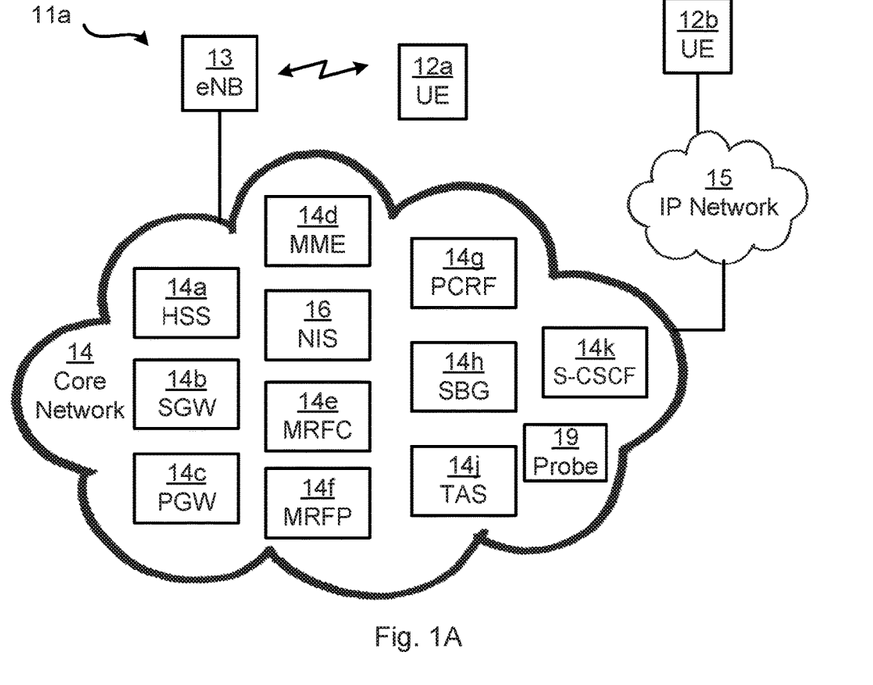
FIG. 1A is a schematic diagram illustrating a communication network according to embodiments.

FIG. 1A shows a schematic overview of an exemplifying communications network 11a where embodiments presented herein can be applied. The communications network 11a comprises a network node (NN) 13 providing network coverage over cells (not shown). A user equipment (UE) 12a, positioned in a particular cell is thus provided network service by the network node 13 serving that particular cell. As the skilled person understands, the communications network 11a may comprise a plurality of network nodes 13 and a plurality of UEs 12a operatively connected to at least one of the plurality of network nodes 13. The network node 13 is operatively connected to a core network 14. The core network 14 comprises a network information system (NIS) 16, which will be further disclosed below. The core network 14 may provide services and data to the UE 12a operatively connected to the network node 13 from an external Internet Protocol (IP) packet switched data network 15. At least parts of the communications network 11a may generally comply with any one or a combination of W-CDMA (Wideband Code Division Multiplex), LTE (Long Term Evolution), EDGE (Enhanced Data Rates for GSM Evolution, Enhanced GPRS (General Packet Radio Service)), CDMA2000 (Code Division Multiple Access 2000), WiFi, microwave radio links, HSPA (High Speed Packet Access), etc., as long as the principles described hereinafter are applicable.

A UE 12b may further have a wired connection to the external IP packet switched data network 15. Examples of UEs 12a, 12b include, but are not limited to end-user equipment such as mobile phones, tablet computers, laptop computers, and stationary computers. In general terms, a UE 12a, 12b as herein disclosed may have either a wireless connection, or a wired connection, or both a wireless connection and a wired connection to the IP packet switched network 15. Hence the communications network 11a may comprise any combinations of purely wirelessly connected UEs 12a, purely wired connected UEs 12b, and UEs 12a, 12b with both wireless and wired connections.

The core network 14 comprises a Home Subscriber Server (HSS) 14a, or User Profile Server Function (UPSF). The HSS is a master user database that supports the IMS network entities that actually handle calls. In general terms, it comprises subscription-related information (subscriber profiles), performs authentication and authorization of the user, and can provide information about the subscriber's location and IP information.

The core network 14 comprises a serving gateway (SGW) 14b and a packet data network (PDN) gateway (PGW) 14c which deal with the user plane. They transport the IP data traffic between the User Equipment (UE) and external networks, such as the IP network 15. The SGW is the point of interconnect between the radio-side and the packet core network. As its name indicates, this gateway serves the UE by routing the incoming and outgoing IP packets. It is the anchor point for the intra-LTE mobility (i.e. in case of handover between eNodeBs) and between LTE and other 3GPP accesses. It is logically connected to the other gateway, the PGW. The PGW is the point of interconnect between the packet core network and external IP networks 15. The PGW also performs various functions such as IP address/IP prefix allocation or policy control and charging.

The core network 14 comprises a Mobility Management Entity (MME) 14d which deals with the control plane. It handles the signaling related to mobility and security for E-UTRAN access. The MME is responsible for the tracking and the paging of UE in idle-mode. It is the termination point of the Non-Access Stratum (NAS).

The core network 14 comprises a Policy and Charging Rules Function (PCRF) 14g. In general terms, the PCRF is the network node designated in real-time to determine policy rules in the multimedia network.

The core network 14 comprises a telecom application server (TAS) 14j. The TAS may be either a software framework that provides a generalized approach to creating an application-server implementation, without regard to what the application functions are, or the server portion of a specific implementation instance. In either case, the function of the TAS is dedicated to the efficient execution of procedures (programs, routines, scripts) for supporting its applied applications.

The core network 14 comprises a Serving Call Session Control Function (S-CSCF) 14k. The S-CSCF is the central node of the signalling plane. It is a SIP (session Initiation Protocol) server, but performs session control too. It is located in the home network. It uses Diameter Cx and Dx interfaces to the HSS to download user profiles and upload user-to-S-CSCF associations (the user profile is only cached locally for processing reasons only and is not changed). All necessary subscriber profile information may be loaded from the HSS.

The core network 14 comprises a Media Resource Function Processor (MRFP) 14f. The MRFP is a media plane node used to mix, source or process media streams. It can also manage access right to shared resources.

The core network 14 comprises a Media Resource Function Controller (MRFC) 14e. The MRFC is a signalling plane node that interprets information coming from a TAS and S-CSCF to control the MRFP.

The core network 14 comprises a Session Border Gateway (SBG) 14h. The SBG handles signaling and media control.

The above core network entities 14a-k may be regarded as exemplifying different types of data transport nodes in the communication network 11a.

The embodiments disclosed herein relate to determining transport conditions in a communications network. In order to determine transport conditions in a communications network there is provided a network information system (NIS), a method performed by the network information system, a computer program comprising code, for example in the form of a computer program product, that when run on a network information system, causes the network information system to perform the method.

Figure 1B:
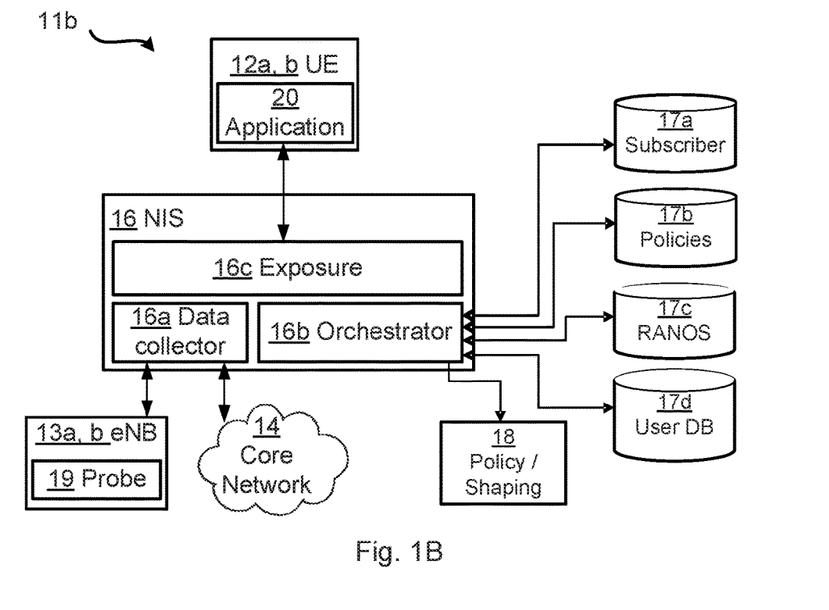
FIG. 1B is a schematic diagram illustrating a communication network according to embodiments.

FIG. 1B shows a schematic overview of a NIS 16 and examples of interfaces to other entities and devices in a communications network 11b. In general terms, the NIS is subsystem of an access network, such as an LTE multimedia broadband access network, that may provide an application of a connected device handling real time media flows with information about the currently applicable networks transport related properties relevant for adapting the user experience of the application to transport conditions of the communications network. The NIS 16 comprises a data collector (DC) module, an orchestrator (O) module, and an exposure (E) module, the functionalities of which will be further disclosed below. According to the embodiment illustrated in FIG. 1B the DC module is configured to interface at least one network node 13a, 13b and entities in the core network 14; the O module is configured to interface a subscriber database 17a, a policy database 17b, a Radio Access Network operation support (RANOS) database 17c, a user database 17d, and a policy and shaping entity 18; and the E module is configured to interface an application of a UE 12, or other nodes involved in the transport of real time media flow. The herein disclosed embodiments thus enable an interaction between an application layer of a connected device, such as the UE 12, and the access network implementing at least a part of the transport needed to establish an end-to-end connection between connected devices.

The interaction between the application layer of the UE 12 and the NIS 16 may be realized in at least two different ways. One way is to implement a request-response model where an application layer entity may query the NIS 16 for network properties given that a certain radio-bearer is to be used to a certain end-point device. Such a request may be related also to existing radio-bearers to determine if service changes are possible. The request-response model may be used before the actual service is active and to deliver a consistent experience to end-users of the end-point devices, for instance for the end-point devices to decide whether to show an icon indicating that video communication is possible or not.

Another way to implement the interaction between the application layer of the UE 12 and the NIS 16 is based on asynchronous event notifications provided by the NIS 16 to an application layer entity when a parameter of interest for the application changes. This may be realized by an event filter in the NIS 16 being triggered, the NIS 16 thereby providing feedback to the application layer. The NIS 16 may use information from Radio Access Network (RAN) entities such as eNBs reporting characteristics related to the delivery of IP packets over the radio link to and from the eNB. The information from eNBs and other RAN entities may be collected in the NIS 16. The NIS 16 may then combine information about radio conditions with other information available to the NIS 16, e.g., as stored in any of the databases 17*a*-*d*. The NIS 16 may then generate events and responses as results of queries from the application.

The response from the NIS 16 may have different semantics. According to some embodiments the NIS 16 provides detailed bitrate recommendations for the characteristics of the radio bearer, such as bandwidth, delay, and packet loss, that the application may assume to be valid for a certain time span in the future. It may also be that ranges are used to express the properties. According to some embodiments the NIS 16 provides reports on load experienced in an area, a cell, per UE and/or per radio bearer along with triggers on changes in available bitrates. Such reporting of statistics may be exposed with the intent of allowing the application to determine its own application and context specific recommended action.

In order to enable the network operator to provide differentiation, and also prevent less prioritized applications to allocate all available capacity, mechanisms may be needed for filtration and adjustments to the service and user.

The NIS 16 may be enabled to support customization to applications and subscriptions. The NIS 16 may therefore keep records per application and subscriber as well as policies for how to combine information determined by the NIS 16 with filters according to the desired differentiation per application and/or subscriber. The NIS 16 may also be provided with parameters relating to dimensioning and load of the network and enabled to influence the traffic from an application by invoking a policy and shaping functionality.

Since the NIS 16 may expose significant information about the operators' operation and the network, certain security systems may be implemented in the NIS 16. According to embodiments only authorized access to the NIS information being exposed is allowed. According to embodiments access to NIS information is limited to only the application's own media transport flows.

The exposure module is configured to interact with the orchestrator module about each particular request from a user of the NIS 16. The orchestrator module is configured to combine information about the request, bearer type, service, RAN deployment and management information (RANOS), with end-point, who the user are and their subscription information (e.g., as stored in the subscriber database) to determine parameters influencing the response according to policies (e.g., as stored in the policy database). This may also imply the orchestrator module to impose restrictions on other traffic flows as well as control of the media flows associated with the user, including applying policing and shaping.

The application interfaces with the exposure module to request information from the NIS 16, or to request to receive events if parameters the application has interest in moves outside of an expected range. The boundaries for triggering events may be specified through filter definitions. This can include absolute boundaries for parameter values, rate of change of parameters values, etc. The values may relate to bitrate, packet loss, access transport delay, etc. When the NIS 16 detects that parameters trigger the specified filter an event is sent to the application. The application may then react in an application specific way.

Having the network providing directional network information to the application enables the application to react timely to network impairments, such as bitrate reductions, but also to take advantage of available network capacity to improve, or add, media streams thus resulting in an improved quality of experience for the user of the application.

Figure 2A:
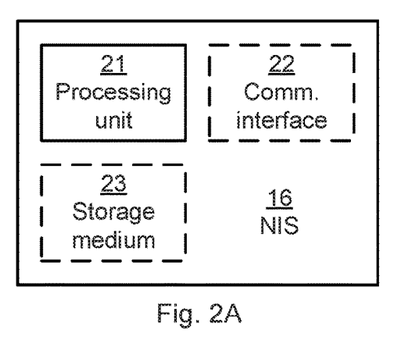
FIG. 2A is a schematic diagram showing functional modules of a network information system according to embodiments.

FIG. 2A schematically illustrates, in terms of a number of functional modules, the components of a network information system (NIS) 16 according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 31 (as in FIG. 3), e.g. in the form of a storage medium 23. Thus the processing unit 21 is thereby arranged to execute methods as herein disclosed. The storage medium 23 may also comprise persistent storage, which, for example, can be any single one or combination of magnetic memory, optical memory, solid state memory or even remotely mounted memory. The NIS 16 may further comprise a communications interface 22 for receiving and providing information to other modules and devices in the communications network 11*a*, 11*b*. The processing unit 21 controls the general operation of the NIS 16, e.g. by sending data and instructions to the storage medium 23, retrieving data and instructions from the storage medium 23, sending control signals to the communications interface 22, and receiving reports from the transmitter communications interface 22 of its operation. Other components, as well as the related functionality, of the NIS 16 are omitted in order not to obscure the concepts presented herein. The NIS 16 may be provided as a stand-alone device or as a part of a further device.

Figure 2B:
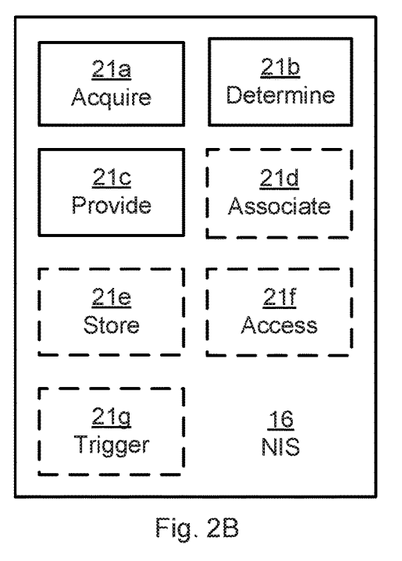
FIG. 2B is a schematic diagram showing functional units of a network information system according to embodiments.

FIG. 2B schematically illustrates, in terms of a number of functional units, the components of a NIS 16 according to an embodiment. The NIS 16 of FIG. 2B comprises a number of functional units; an acquire unit 21*a*, a determine unit 21*b*, and a provide unit 21*c*. The NIS 16 of FIG. 2B may further comprises a number of optional functional units, such as any of an associate unit 21*d*, a store unit 21*e*, an access unit 21*f*, and a trigger unit 21*g*. The functionality of each functional unit 21*a*-*g* will be further disclosed below in the context of which the functional units may be used; all herein disclosed steps of acquiring may be performed by the acquire unit 21*a*; all herein disclosed steps of determining may be performed by the determine unit 21*b*; all herein disclosed steps of providing may be performed by the provide unit 21*c*, and likewise for steps corresponding to the functional modules 21*d*-*g*. In general terms, each functional unit 21*a*-*g* may be implemented in hardware or in software. The processing unit 21 may thus be arranged to from the storage medium 23 fetch instructions as provided by a functional unit 21*a*-*g* and to execute these instructions, thereby performing any steps as will be disclosed hereinafter.

Figure 2C:
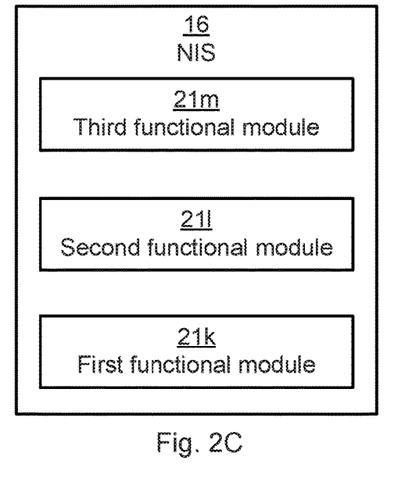
FIG. 2C is a schematic diagram showing functional modules of a network information system according to embodiments.

FIG. 2C schematically illustrates, in terms of a number of functional modules, the components of a NIS 16 according to an embodiment. The NIS 16 of FIG. 2C comprises a first functional module 21*l*, a second functional module 21*m*, and a third functional module 21*n*. The second functional module 21*n* is operatively connected to the first functional module 21*l* and the third functional module 21*n*. According to embodiments, the first functional module 21*l* is a data collector (DC) module. According to embodiments, the second functional module 21*m* is an orchestrator (O) module. According to embodiments, the third functional module 21*n* is an exposure (E) module. Each module may be physically separate or co-located with another module.

Figure 3:
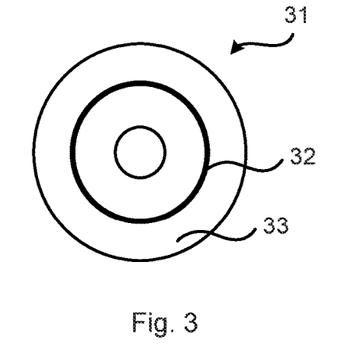
FIG. 3 shows one example of a computer program product comprising computer readable means according to an embodiment.
Figures 4, 5:
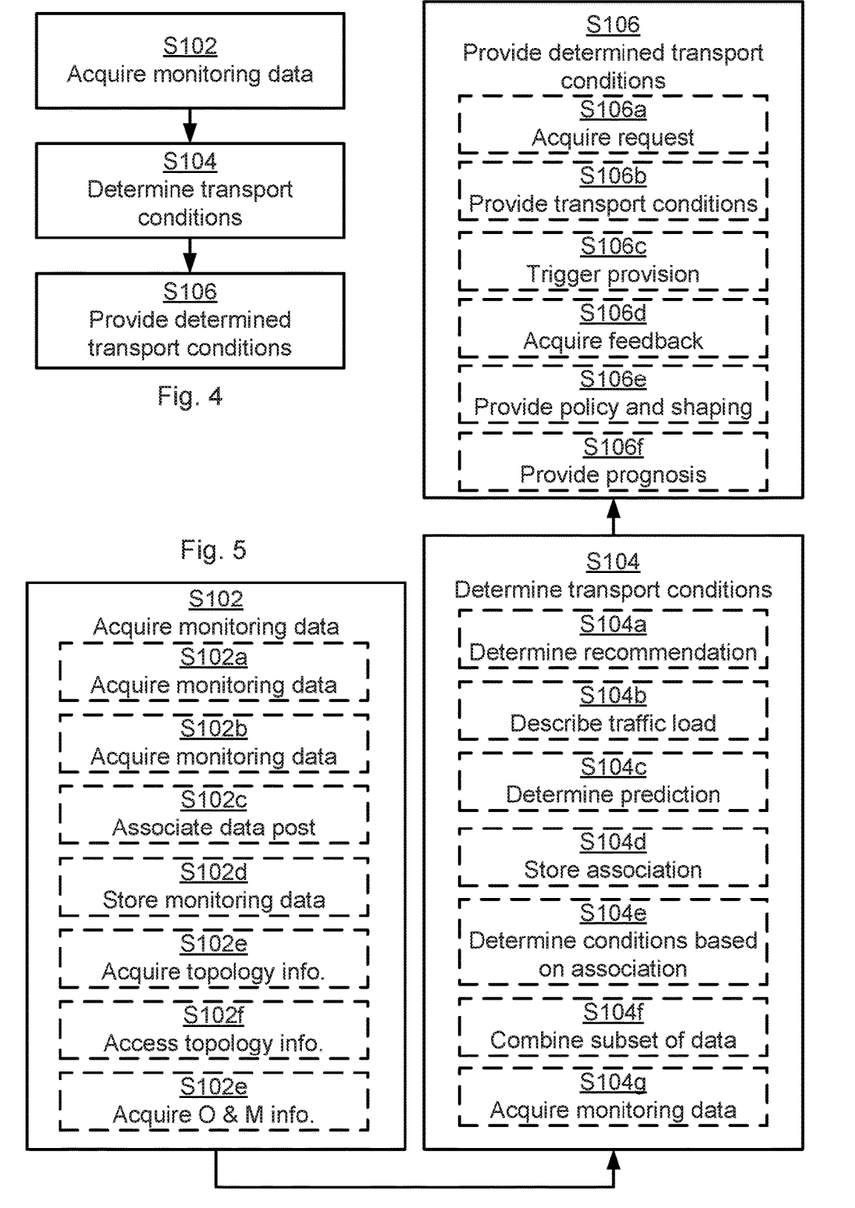
FIG. 4 is a flowchart illustrating a method according to an embodiment.
FIG. 5 is a flowchart illustrating a method according to an embodiment.

FIG. 4 and FIG. 5 are flow charts illustrating embodiments of methods for determining transport conditions in a communications network 11a, 11b. The methods are performed by the NIS 16. The methods are advantageously provided as computer programs. FIG. 3 shows one example of a computer program product 31 comprising computer readable means 33. On this computer readable means 33, a computer program 32 can be stored, which computer program 32 can cause the processing unit 21 and thereto operatively coupled entities and devices, such as the storage medium 23, and/or the communications interface 22 to execute methods according to embodiments described herein. The computer program 32 and/or computer program product 31 may thus provide means for performing any steps as herein disclosed.

In the example of FIG. 3, the computer program product 31 is illustrated as an optical disc, such as a CD (compact disc) or a DVD (digital versatile disc) or a Blu-Ray disc. The computer program product 31 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 32 is here schematically shown as a track on the depicted optical disk, the computer program 32 can be stored in any way which is suitable for the computer program product 31.

Reference is now made to the flowchart of FIG. 4 disclosing a method for determining transport conditions in a communications network according to an embodiment. In general terms, more accurate knowledge about actual network characteristics for some localized part of the communication network 11a, 11b at a given point in time may be available in data transport nodes. Such information may be managed by a Network Information System (NIS) 16. A NIS 16 which provides applications with network information related to transport flows for real-time media will now be described in more detail.

The NIS 16 comprises a first functional module. The first functional module is arranged to acquire monitoring data from a plurality of data transport nodes 13, 13a, 13b, 14b, 14c, 14f, 14h in a communications network 11a, 11b. The processing unit 21 of the NIS 16 is thus arranged to, in a step S102, acquire this monitoring data. The acquiring may be performed by executing functionality of the acquire unit 21a. The computer program 32 and/or computer program product 31 may thus provide means for this acquiring.

The NIS 16 comprises a second functional module. The second functional module is arranged to determine transport conditions from network information related to transport flows for network transmission of real time media flows. The processing unit 21 of the NIS 16 is thus arranged to, in a step S104, determine these transport conditions. The determining may be performed by executing functionality of the determine unit 21b. The computer program 32 and/or computer program product 31 may thus provide means for this determining. The network information is determined from a subset of the acquired monitoring data. The transport conditions may be determined as prognosis, such as predictions or estimates.

The NIS 16 comprises a third functional module. The third functional module is arranged to provide the determined transport conditions. The processing unit 21 of the NIS 16 is thus arranged to, in a step S106, provide these transport conditions. The providing may be performed by executing functionality of the provide unit 21c. The computer program 32 and/or computer program product 31 may thus provide means for this providing. The transport conditions are provided to at least one of a network connected device 12, 12a, 12b running an application 20 involving said network transmission of real time media flows and a data transport node 13, 13a, 13b, 14b, 14c, 14f, 14h involved in the network transmission of real time media flows. Thus according to an embodiment the transport conditions are provided to at least one such network connected device 12, 12a, 12b; according to an embodiment the transport conditions are provided to at least one such data transport node 13, 13a, 13b, 14c, 14f; and according to an embodiment the transport conditions are provided to at least one such network connected device 12, 12a, 12b as well as to at least one such data transport node 13, 13a, 13b, 14c, 14f.

The first functional module may be a data collector (DC) module 16a. The second functional module may be an orchestrator (O) module 16b. The third functional module may be an exposure (E) module 16c. The second functional module may be located in a network node, for example in a radio base station site, such as in an eNodeB or radio network controller (RNC) site.

Reference is now made to the flowchart of FIG. 5 disclosing methods for determining transport conditions in a communications network according to further embodiments. Embodiments relating to operations of the DC module (e.g., as performed by the first functional module), the O module (e.g., as performed by the second functional module), and the E module (e.g., as performed by the third functional module 2), will now be disclosed in turn.

DC Module

Further embodiments relating to the first functional module, e.g., implemented as a DC module, will now be disclosed.

Information probes 19 may be located in the plurality of data transport nodes 13, 13a, 13b, 14b, 14c, 14f, 14h. Thus, according to an embodiment the first functional module is arranged to, in an optional step S102a, acquire monitoring data from information probes located in the plurality of data transport nodes.

There may be different types of monitoring data to be acquired. For example, the monitoring data may relate to available capacity, load, available and used resources, amount of used transmitter energy, code space, amount of end-points, and/or configured radio-bearers associated with the transport flows for the network transmission of the real time media flows. Thus, according to an embodiment the first functional module is arranged to, in an optional step S102b, acquire monitoring data relating to at least one such type.

The monitoring data may comprise a plurality of data post. According to an embodiment the first functional module is arranged to, in an optional step S102c, associate each data post with at least one of a time instant for when the data post was generated, network location, radio bearers or individual transport flows, and wherein each data post further comprises at least one of a source address, a source port, a destination address, a destination port, and identification of a protocol. Identification of the transport flows may vary from only source and destination IP address to source address+port, destination address+port, protocol and any preferential treatment label, such as differentiated services code point (DSCP), bearer class etc.

The acquired monitoring data may be stored in a database. Thus, according to an embodiment the first functional module is arranged to, in an optional step S102d, store the acquired monitoring data in a database.

Topology information of the communications network may comprise a relation between different radio network cells in the communications network. This relation may describe the topology of interconnected data transport nodes, data path capabilities, data link capabilities, data transport node capabilities, and geographical relations between different radio network cells in the communications network. Thus, according to an embodiment the first functional module is arranged to, in an optional step S102e, acquire such topology information of the communications network.

The topology information may be accessed so as to determine bottlenecks in the communication network. Thus, according to an embodiment the first functional module is arranged to, in an optional step S102f, access the topology information to determine which data transport nodes and data links the real time media flows will be routed through.

The NIS 16 may consider information relating to an access network, particularly operations and management information. Thus, according to an embodiment the communications network comprises an access network. The first functional module may then be arranged to, in an optional step S102g, acquire operations and management information regarding the access network. Examples of operations and management information include, but are not limited to, capacity, planned maintenance, failures, etc. regarding the access network.

O Module

Further embodiments relating to the second functional module, e.g., implemented as an O module, will now be disclosed.

The transport conditions may be recommendation for transmission parameters to be used by at least one of the network connected device and the data transport node during transmission of the real time media flows. Examples of transmission parameters include, but are not limited to, a time interval for validity of the recommendation, bandwidth, burst-size, packet size, and redundancy parameters. Thus, according to an embodiment the second functional module is arranged to, in an optional step S104a, determine the determined transport conditions as a recommendation for transmission parameters to be used by at least one of the network connected device and the data transport node during transmission of the real time media flows.

The transport conditions may describe traffic load experienced in at least one of an area in the communications network, a data transport node, a cell in communications network, in a user equipment, a data link, and of a radio bearer. Thus, according to an embodiment the second functional module is arranged to, in an optional step S104b, determine the determined transport conditions to describe such traffic load.

The transport conditions may be determined as a prediction for future network transmission of real time media flows. Thus, according to an embodiment the second functional module is arranged to, in an optional step S104c, determine, from the network information, the transport conditions as such a prediction.

A record may be kept per application and subscriber. In order to do so there may be an association between the subset of the acquired monitoring data and subscriber information and policies for the application involving the network transmission of real time media flows. Thus, according to an embodiment the second functional module is arranged to, in an optional step S104d, store such an association; and, in an optional step S104e, determine the transport conditions for the network connected device based on the association.

The transport conditions may be determined based on further information. For example, the transport conditions may involve combining the subset of the acquired monitoring data with further information. Examples of such further information include, but are not limited to, information about at least one of bearer type, service, radio access network deployment, management information, end-point information, and subscriber information associated with the transport flows for the network transmission of the real time media flows. Thus, according to an embodiment the second functional module is arranged to, in an optional step S104f, determine such transport conditions.

The second functional module may consider monitoring data acquired by at least two first functional modes. That is, the O module may acquire monitoring data from several DC modules. Thus, according to an embodiment the second functional module is arranged to, in an optional step S104g, acquire monitoring data from a plurality of first functional modules.

E Module

Further embodiments relating to the third functional module, e.g., implemented as an E module, will now be disclosed.

The NIS 16 may operate according to a request-response model. Thus, according to an embodiment the third functional module is arranged to, in an optional step S106a, acquire a request for said transport conditions. The request may originate from the network connected device and/or the data transport node. The request may be a request for a prediction of the transport conditions. The request may further comprise a time interval for validity of the prediction, and/or a confidence value of the prediction.

The NIS 16 may operate to provide asynchronous event notifications. Thus, according to an embodiment the third functional module is arranged to, in an optional step S106b, provide the determined transport conditions to the network connected device and/or the data transport node as an event notification.

There may be different triggering of the asynchronous event notifications. For example, the event notification may be triggered in response to a parameter of previously determined transport conditions for the network transmission of real time media flows having changed more than a predetermined threshold value. Thus, according to an embodiment the third functional module is arranged to, in an optional step S106c, trigger provision of the event notification accordingly.

Feedback from the network connected device relating to how the determined transport conditions affected the network transmission of real time media flows may be available from the network connected device. Thus, according to an embodiment the third functional module is arranged to, in an optional step S106d, acquire such feedback. Further, according to an embodiment the third functional module is arranged to, in an optional step S106e, provide the network connected device and/or the data transport node with policy and shaping conditions for at least the network transmission of real time media flows from the network connected device.

The determined transport conditions may be provided as a prognosis. The prognosis may be associated with a confidence level and a time interval for validity Thus, according to an embodiment the third functional module is arranged to, in an optional step S106f, provide at least one of the network connected device and the data transport node with the determined transport conditions as such a prognosis.

Further examples relating to the above disclosed methods for determining transport conditions in a communications network as performed by the NIS 16, and in particular to the first functional module, e.g., implemented as a DC module, the second functional module, e.g., implemented as an O module, and the third functional module, e.g., implemented as an E module, will now be disclosed.

In the radio base stations, such as an LTE eNBs, network routers and switches and any type of nodes that routes or forwards traffic, such as SSGN, GGSN and Packet Gateways or other data transport nodes, such as backhaul links and core network paths, and/or core network routers, where network bottlenecks and/or resource congestion may exist, information probes may be added. Information probes may thus be installed on bottlenecks primarily being represented by queues in routers or in network nodes, such as radio base stations, where either flow combinations and/or underlying variability (radio) effects of the available resources and capacity, as well as for network segments. Each of the information probes may be provided with an identity, and the NIS 16 may have access to information describing the topology and/or geographical location for the information probes. The radio bases may be associated with cell IDs, to correctly be able to determine when the data collected by the information probes will be relevant to use. Network segments may be both individual links, including backhaul links of various types such as radio based, fiber based, copper based, etc. Properties may be associated with both bottlenecks and network segments; network segments have a non-zero minimal transmission delay.

Each information probe is configured to provide a set of data points that are relevant for the type of node and bottleneck/network segment the information probe monitors. As an example, an eNB scheduler queue is different from a routing queue in a wired router as the scheduler works with a transport medium that has variable properties that needs to be taken into account. Additional parameters may be provided to enable improved determination or predictions for the network behavior and properties. Thus the relevant parameters to monitor and report may be configured for each information probe, for example based on what data the information probe collects.

The information probes are thus configured to collect information relevant for generating accurate views of the current network situation at the site of the probes and for forming a basis for predictions of future network situations. The collected information may for example include, but not be limited to, current throughput (optionally for each traffic class/radio bearer type) in bits per second, current amount of radio transmission energy used, current cell load level (optionally for each traffic class and/or optionally expressed in percentage of a maximum cell load), transmission delay (minimal, maximum, average, and percentiles) observed for the last reporting interval, queue delay (minimal, maximum, average, and percentiles) observed for the last reporting interval, flow jitter introduced (minimal, maximum, average, and percentiles) observed for the last reporting interval, and other available and used resources (such as amount of used transmission energy, code-space frequency and slots, amount of end-points, configured radio-bearers, real-time and other types of network transport flows crossing the bottleneck). Each of these parameters may be associated with a bottleneck or a network segment and its location. For example an eNB may have at least two bottlenecks, one for downlink transmission capacity to a UE, and another for uplink transmission capacity from the UE.

This information may by the NIS 16 be associated with at least one of bottleneck locations, radio bearers or individual transport flows identified by 5-tuple (source address, source port, destination address, destination port, and protocol) as well as any additional packet content or marking such as a DSCP (differentiated services code point).

The information probe may be configured with a reporting interval, for example in the order of 10-500 ms, preferably 100-250 ms, more preferably about 150 ms. The information probes may thus at regular intervals send a report to the data collector module comprising the ID of the information probe and the collected information. The communications between the information probes and the data collector module may be based on the Stream Control Transmission Protocol (SCTP) with partial reliability.

Snapshots of the collected information may thus frequently be sent to the data collector module, creating a database of the current and near-term history for the information provided from related (e.g., geographically or topology related) sets of information probes. The data collector modules may be deployed at service sites. The data collector modules may, for example, be deployed at existing 2G and 3G radio network controller (RNC) sites. This provides a low latency between the information probes and data collector modules. This may also reduce the load from the RNC site into the core network.

By enabling sub-sets of the information probes to use different data collector modules the NIS 16 can be scaled, both in terms of necessary processing in the data collector module but also in regards to the amount of data traffic aggregated at each data collector. Data collection may be regarded as a constant process in the NIS 16. The databases of the NIS 16 should contain data that is current, up to date, and valid to enable the orchestrator module to provide accurate responses. Thus timely and periodic reporting from the information probes is desired to avoid having to query a particular information probe when a particular request is being processed.

The data collector module may be regarded as having a responsibility for a set of information probes and the location in the network topology of these information probes may be such that it has short latencies from the information probes to the data collector module for the data collector module to be able to provide timely reporting of filter triggering events to the orchestrator module.

By enabling sub-sets of the information probes to use different data collector modules the NIS 16 can be scaled, both in terms of necessary processing in the data collector module but also in regards to the amount of data traffic aggregated at each data collector. Data collection may be regarded as a constant process in the NIS 16. The databases of the NIS 16 should contain data that is current, up to date, and valid to enable the orchestrator module to provide accurate responses. Thus timely and periodic reporting from the information probes is desired to avoid having to query a particular information probe when a particular request is being processed.

The data collector module is configured to, upon receiving collected information from an information probe, add the collected information to at least one database. The data collector module may further process statistics over the received collected information to keep statistics relevant for the orchestrator module to be up to date. Such statistics may include, but not be limited to, variance, slope, and acceleration. The data collector module may also process multiple metrics into new metrics of higher abstraction; for example total available bandwidth may be determined based on available transmission power, etc.

The NIS 16 may further have access to topology information of the relation between different radio network cells.

This information may be useful for enabling information about which nearby cells an end-point device may be handed over to. Further, routing topology information may be needed for the NIS 16 to be able to determine which bottlenecks in the network a particular media flow will be routed through. Operations and management (O/M) information regarding the access network may be used to provide information about faults, planned maintenance, or other reasons affecting the network capacity or behavior, either currently or in the near future.

Further, the network operator may have a set of policies and configuration parameters for how the network should operate. Such information may comprise which applications that are entitled to access network information, how often or how much the application is allowed to retrieve information from the network, any differences in network usage due to type of network access subscription/agreement that each user has, if different prioritization based on time of day is made in the network, the general load in network, etc.

To be able to map a particular end-point device to a subscription type at least limited access to subscriber/account information may be needed for the NIS 16.

The exposure module is configured to interact with real-time applications. This provides a secure, access controlled interface to which applications can send requests for current information related to existing or future transport flows to or from a particular end-point device or request events according to specified filters. The exposure module may be located in a service site, possibly in a DMZ (Demilitarized Zone) entity for security reasons. The exposure module may be configured to send responses to the application from the NIS 16; it may also be configured to issue events to the application when so prompted by the orchestrator module. Any communication may be secured between the application and the exposure module to prevent modification, and possibly be configured to prevent information leakage about the network to a third party. The access to the interfaces may thus require authorization to prevent undesired usage of the functionality provided by including protection against denial of service attacks, created by an overload of requests. The exposure module may be configured to sanitize the requests, especially subscription for events with filter manifests, so that the requests do not represent a threat to the NIS 16 or a breach of the user integrity.

In general terms, the orchestrator module is responsible for receiving information from at least one data collector module, policy and configuration information, O/M access network information, subscriber information. The orchestrator module may be deployed in service sites so as to be centrally placed and have access to the databases as disclosed above as well as being configured for processing and storage of statistics and history collection.

The orchestrator module may use the received information to process requests, monitor event filters on established subscriptions, and generate responses or events. The orchestrator module may also request shaping or policing of packet flows to handle unresponsive flows or affect flows relative priority to resources. An application having traffic flows that follows the information provided by the NIS 16 should not need to be policed or shaped. An application having traffic flows that do not follow the recommendations from the NIS 16 may result in overuse of resources and resulting congestion negatively effecting the application. According to embodiments it may be beneficial to apply policy and shaping to the application only in cases where the bottleneck which the NIS 16 is reporting on is shared with other users. In such cases policing may prevent an ill-behaving application from using more than its share of the network resources (as determined by the NIS 16). Sets of traffic flows that do not use the NIS 16 but share bottleneck with traffic flows from an application using NIS 16 may be shaped and/or policed to their share of the bottleneck resources to prevent those flows to consume resources that the NIS 16 has signaled is available for the traffic flows of the application using the NIS 16.

The application, when receiving a response or an event produced by an established subscription to the NIS 16, may be configured to take application specific decisions on how to act on the provided information. This information is intended to provide the application with knowledge of the current situation in the network where the end-point device of interest is located, either using more underlying data or in an aggregated form using parameters, such as the maximum supported bitrate, packet loss, delay statistics, etc. The information may also be provided in form of different prognosis with potential different time-scales and confidence levels.

In cases where delay for the orchestrator module acting on any network information should be minimized, the orchestrator module as well as the data collector module(s) (for a small area of the network and the information probes part of this area of network) may be located in a radio base station site, such as in an eNB site, or possibly the equivalent of the RNC site. Thereby the information probe to data collector module delay short, and also keeping the data collector module to orchestrator module transmission delay minimal. Depending on the interface to the application or if local break out is used, the exposure module may also be deployed at this site.

A distributed deployment of the data collector module, the orchestrator module, and the exposure module may require a high level of requirements on load balancing of requests from application to the NIS 16 to be directed to an orchestrator module that has access to the data collector module close or local to the orchestrator module picked. In this case topological and geographical data may be more important to consider than load data during the load balancing as long as a single orchestrator module does not become overloaded.

In general terms, it is the responsibility of the application to affect any existing traffic flows from the device running the application. Any consequence of the application not utilizing the information provided from the NIS 16 may vary and the impact on the application may be application dependent.

Further embodiments relating to how the NIS 16 may interact with the application will now be disclosed in further detail.

An application may use the NIS 16 of a particular service provider. Hence, there may be one NIS 16 per service provider. Alternatively, at least two service providers may share one NIS 16. The application may have requested provisioning of access to the NIS 16 and may have been given such access rights by the NIS service provider. Such provisioning may include any security information, such as certificates, access tokens, etc., The application may also have been provisioned with address information for a NIS exposure module interface and its API (application programming interface) definition. The actual API may have different realizations. However, the API may provide the application with at least two different modes of operation, depending on in which phase the application is operating in.

A first mode of operating for the application to interface with the NIS 16 may primarily be intended to be used prior to or during establishment of a communication session so as to determine if resources are available for traffic (such as media streams) intended to be transmitted by the application. This mode of operating may be provided by a request/response interface to the NIS 16.

A second mode of operating for the application to interface with the NIS 16 may primarily be intended to be used for providing information to the application from the NIS 16 regarding existing traffic (such as media flows) transmitted from the application. Thus, the application may request a subscription/notification for event notifications when parameters that are of importance for the transmission of traffic from the application changes sufficiently according to specified filters. The NIS 16 is configured to rapidly notify the application when such an event occurs. The application may be notified by the NIS 16 about the event and any relevant parameters describing the event and the changes, for example a reduction or an increase in available transmission bitrate for a particular traffic flow direction in the network.

Further details relating to request/response based communications between the NIS 16 and the application will now be disclosed.

A real-time media application that has been provisioned with access rights, the location of the NIS exposure module interface, and the API definition may send a NIS information request relating to available transmission bitrate, expected packet loss rates, etc. between two particular end-point addresses associated with transmission of traffic from the application. These end points can be specified as an IP address, or device identifiers, such as the International Mobile Equipment Identity (EMEI). The type of transport flows may also be indicated; it may be indicated if the traffic flows will be requesting any particular Quality of Service (QoS) or is intended to use any particular radio bearers which would affect resource consumption and thus the value for a particular information type, such as available bitrate, path delay or packet loss rates, etc. The request may also include parameters indicating that the application requests receipt of a response comprising a prediction about the near future. The request may also indicate over which time-duration the prediction is requested for, and with which confidence values that should be provided. Either of the values could be given default values, such as 5 seconds and 95% probability to hold.

The exposure module may be configured to verify the access rights for the application when it receives the request. The exposure module may be configured to perform a sanity check of the request so that it is plausible and syntactical correct request and not an attempt of denial of service. The exposure module may further be configured to request throttling on a per application/user of the interface to prevent externals parties to overload the NIS and deny service for other uses of the NIS. The exposure module may be configured to forward the request to the orchestrator module after verifications of the request the request.

The orchestrator module may be configured to start processing the request once received. One step may comprise interpreting what information is necessary to reply to the request. Thus information about end-point(s), which type of transport flow is to be established, identity of the user, and which information is requested may be parsed from the request.

The orchestrator module may be configured to determine the policy for the application, thereby determining which process shall be used, and if predictions are allowed for the application. Further, any network access subscriptions associated with the end-points and their users may be retrieved. This may include access to any specific QoS or radio-bearer configurations that has been requested in the NIS request from the application.

The end-point address information may allow the orchestrator module to derive the locations between which the flow will be routed within the network covered by the NIS 16. If any of the end-points are within a network for which the service provider has NIS information, the orchestrator module may determine the end-point locations and which point of access traffic flows may use to the network, such as a particular radio base station. If one end-point is outside of the network for which NIS information is provided, the point of ingress and/or egress to that network, e.g., an access gateway to the Internet, may be determined using routing information in the network. The routing information may allow the orchestrator module to determine the flow path through the network and which network segments and bottlenecks that may be involved. This route may be determined even without an actual flow by observing how the network would route a flow with the stipulated properties, such as QoS and/or differential service (DiffServ) markings and the given address information.

The orchestrator module may be configured to, for each determined bottleneck and network segment for the traffic flow, query the relevant data collector modules for the data sets required to determine predictions or determine currently valid values for the requested information objects. Thus the parameters in the NIS request may influence which data is requested. A current value may be determined using only the latest reported values for data that is relevant to the information objects requested. Predictions may require either a set of historic data or additional statistics value to allow the predictions to be determined.

The orchestrator module may be configured to use the requested data objects to determine a response data object for each type of data requested. Examples of data parameters containing current data values to consider include, but are not limited to: Currently Available Bandwidth, Probability of packet loss in bottleneck, and Average one way delay.

The Currently Available Bandwidth (for example expressed as a bitrate in bits per second): select the lowest value out of the received set of values for path segments and bottlenecks.

The probability of packet loss in bottleneck: determine the combined probability of loss for the parts of the network path the media flows will pass. This may be calculated as the product of the individual segments complement to probability of packet loss (denoted p), i.e. the product of each network segments probability for a packet to not be lost. Thus the packet loss for the sum of segments (where the probability of packet loss in segment k is denoted p_segment_k) and bottlenecks for n segments and bottlenecks becomes: $P\_tot = 1 - ((1-p\_segment\_1) \cdot (1-p\_segment\_2) \cdot \ldots \cdot (1-p\_segment\_n))$.

The average one way delay over included network segments in path per direction: determine the sum of the average delays per network segments assuming no overlap of the network segments.

The orchestrator module may be configured to, when having determined values that were requested, generate a response to the request. The orchestrator module may be configured to send the response to the exposure module. The exposure module may be configured to forward the response to the application.

Further details relating to information subscription/notification based communications between the NIS 16 and the application will now be disclosed.

A real-time application that has, or is in the process of, establishing real-time media traffic flows and request NIS information for those traffic flows may use a subscribe/notification mode of operation, where the NIS 16 sends event reporting on current values or predictions whenever so indicated by a filter definition and thresholds provided by the application. This mode of operation may reduce the amount of consumed resources in the network compared to a request/response mode of operation.

The application generates a subscribe request, e.g., by specifying which traffic flows to monitor, e.g., using a 5-tuple flow specification and optionally together with any QoS classifications, such as DSCP, and a filter manifest describing for what changes of properties the application is to receive a notification, to what entity the event is to be delivered, what information the event (if dispatched) is to contain. This request is by the application sent to the exposure module.

The exposure module is configured to receive the event subscription request and to verify any access rights for the application. The access rights may include the right to request the requested type of information. The exposure module is configured to check the event addressing information. In general terms, such checks may be required since the addressing of events allow network nodes not associated with the application to start receiving events policies. In most cases a policy of only allowing addressing to the source of the subscription request may mitigate any such risks. However, some applications may require larger freedom and may be trusted to have a more lenient policy. The exposure module is configured to perform sanity check of the filter manifest according to a configured system policy. This verification of the filter manifest may be advantageous as some minimal sensitivity rules may be required to avoid having the NIS issue event reports for every update with data from the bottlenecks as collected by the information probes. The exposure module may be configured to forward the subscription request to the orchestrator module if the subscription request is acceptable.

The filter manifest may comprise which set of properties the application is associated with, and may be individual properties and combination of properties. The properties may be related to current values as well as predictions of what the value will be in a specified near future time frame and which confidence that prediction may have. Examples of properties and type of filters that the application may use, and specify filter for, include but are not limited to currently total available bitrate for traffic flow(s) where triggers are set of absolute values, measured network paths cumulative packet loss probability which may be triggered when specified set of thresholds are passed, measured network path one way delay (max, min or average, percentiles) which are triggered when values pass any out of a set of threshold values, measured network path jitter (max, min, average, or percentiles) which are triggered when values pass any of a set of threshold values, rate of change of available bitrates for traffic flow(s) which are triggered when the rate increases or decreases more rapidly than a predetermined threshold during a measurement period, and rate of change for any of the above measurements expressed as change per second over some defined measurement period. Different trigger values for increase versus decrease may be used. As an example, the rate of change of available bitrate for traffic flow(s) may be triggered when the bitrate increases more rapidly than 30 kbps per second over a 300 ms measurement period.

The orchestrator module may be configured to start processing the subscription request and parse out the traffic flow(s) specification, the filter manifest and to associate that with the origin of the request and where to send the events. The orchestrator module may be configured to break down the filter manifest into its basic components and which metrics are needed to be monitored to be able to determine when an event needs to be sent. The orchestrator module may be configured to determine the routing of the traffic flow through the NIS monitored network so that the current set of involved information probes (for example located at in bottlenecks) can be determined.

The orchestrator module may be configured to install basic filter rules in the data collector module based on access to which properties in which bottlenecks to monitor. These basic filters may consider individual properties for an information probe or the information probes of a particular flow, a radio bearer, and/or the GPRS Tunneling Protocol (GTP) tunnels used. If multiple filter manifests currently need the same property of a specific information probe, the orchestrator module may comprise a single filter rule based on the most stringent filter requirement, thus reducing the number of filter rules used by the data collector module. Instead, multiple filter subscription and filter manifests may be associated with one single filter rule.

The filters are related to individual parameters that the data collector module may determine, either directly from received reports from the information probes or determined from received metrics. Examples of such parameters are mentioned in relation to the description of data collection. The filters may also define if the parameter is related to a specific information probe or to a particular traffic flow or radio bearer.

The data collector module may be configured to install these filters on individual probe properties. The data collector module may be configured to, every time a data report is issued for a particular information probe and the reported property has a filter, check if the filter is triggered. If it is triggered an event is sent from the data collector module to the orchestrator module. The event may comprise the ID of the information probe, the property triggering the event and any relevant data set for that property.

The orchestrator module receiving a filter event may be configured to check which filter manifests that are associated with this particular information probe and property. Each of these filter manifests are then processed to determine if the full filter results in a triggering action or not, as the filter function may contain conditional requirements beyond basic filter thresholds established on individual probe properties. This also enables the orchestrator module to skip the filter manifests for which less stringent thresholds were set compared to what the data collector module had installed. The orchestrator module may be configured to, if the full manifest results in that an event is to be dispatched, start generating the event. This event may identify which application instance that is to receive the event, which flow(s) that it relates to, and/or an information object. This information object may be built as specified by the subscription request. This allows the event information to inform the application which property that has changed, such as current delay, minimal bitrate, packet loss, etc. The information object may also include additional information requests, for example providing a prediction for some property.

For example, an event may have been triggered due to the available bitrate having dropped to 400 kbps, which is below a specified threshold at 500 kbps. For example, in addition to what triggered the event and its current value the application may also request a prediction for the average available bitrate during the next 3 seconds with 80% confidence. This may allow the application to determine that the triggering event is, for example, a short duration event if the prediction is 600 kbps, or at least a mid-term if the average is, say, 340 kbps.

The event is dispatched from the orchestrator module to the exposure module, which in turn forwards the event to the application instance subscribing to the event. If that delivery is performed using an existing persistent transport or a temporary established transport may depend on parameters such as frequency of expected events, also taking into account the potential issues for the NIS 16 to reach out to the application instance due to network address translation (NAT) and firewalls.

The orchestrator module may further consider the mobility of the end-points. Thus a traffic flow that is associated with a NIS subscription may change the bottlenecks and thus the information probes that have information relevant to that traffic flow. The data collector module is configured to use the data from the set of information probes it is associated with to process the filters the orchestrator module has installed. By combing mobility neutral flow identification and information regarding where a particular traffic flow currently resides, the data collector module is able to process the filters over the received data so as to determine when event reports need to be sent to the application.

The traffic flows can move between information probes that report to different data collector modules as well as end-points having different parts of the network path within the responsible area of different data collector modules. This may require the orchestrator module to update which basic filters it has installed in relation to the different traffic flows in the different data collector modules. This may be achieved in at least two ways.

One way relies on the make before break principle, where the orchestrator module is configured to determine which data collector module(s) and information probe(s) that may become relevant for a particular traffic flow and also to install basic filters in these data collector modules. When a filter is triggered the orchestrator module verifies if the traffic flow(s) was passing that information probe or not, before acting on the information. In this way relevant information is not missed.

Another way relies on the break before make principle, where the orchestrator module is configured to detect a mobility event as it happens or shortly after it has happened. As soon as the orchestrator module is informed about the event it installs new basic filter events on the relevant data collector modules and on the properties of the information probes and retracts the old ones.

An orchestrator module may have access to policing and/or shaping capabilities in the network, for example in the packet gateways or in the radio scheduler. Such policing and shaping may by the NIS 16 be used to ensure that resources that have been reported to be available to a particular application traffic flow is not allocated by other traffic flows. Thus, sets of traffic flows that have been determined to belong to a particular traffic flow may be policed or shaped to remain within allocations/prioritizations that have been made.

The subscription for NIS event may be terminated when no longer relevant for the application. For that purpose the application may terminate a subscription by transmitting a corresponding termination of service message to the exposure module. However, for application instances that simply vanish there is provided a system based cleanup of old subscriptions. For example, if persistent transport connections exist between the exposure module and the application instance subscribing is terminated cleanup may be performed on relevant subscriptions. This may be enabled by using a transport that supports keep-alive mechanisms. Such keep-alive mechanisms may be configured to a cleanup rate and to keep resource usage low as well not being sensitive to short transients in the network. If non-persistent transports are used, soft state and a periodical renewal from the application instance may be needed. If the monitored traffic flows or radio bearers are terminated or become dormant for extensive time this could be used for triggering a termination of the NIS monitoring subscription.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A network information system (NIS), the NIS comprising:
a memory; and
one or more processors coupled to the memory, wherein the NIS is configured to:
acquire monitoring data from a data transport node, wherein the monitoring data comprises information related to an available capacity associated with a real time media flow, and the data transport node is configured to relay packets of the real time media flow to an application layer of a network connected device;
use the acquired monitoring data to determine a transport condition; and
transmit a message to a media sender of the real time media flow, the message comprising information indicating the determined transport condition.

2. The NIS of claim 1, wherein the media sender of the real time media flow controls a bitrate of the real time media flow.

3. The NIS of claim 1, wherein the NIS further comprises a receiver for receiving an event notification request transmitted by the media sender, the event notification request requesting the NIS to send event notification messages to the media sender.

4. The NIS of claim 3, wherein
the network connected device is endpoint of the real time media flow, and
the event notification request comprises a first endpoint identifier for identifying the network connected device.

5. The NIS of claim 4, wherein the NIS is configured to use the first endpoint identifier to determine a network flow path for the real time media flow, wherein the network flow path comprises a first network segment having an available bandwidth.

6. The NIS of claim 5, wherein the NIS is configured to:
determine the available bandwidth for the first network segment, and
determine, based on the available bandwidth for the first network segment, an available bandwidth for the real time media flow.

7. The NIS of claim 6, wherein the NIS is further configured to:
determine a difference between a) the determined available bandwidth for the real time media flow and b) a previously determined available bandwidth for the real time media flow, compare the determined difference to a threshold to determine whether the determined difference meets a threshold condition, and transmit to the media sender an event notification message as a result of determining that the determined difference meets the threshold condition, wherein the event notification message comprises information indicating the determined available bandwidth.

8. The NIS of claim 7, wherein the NIS is configured to determine the available bandwidth for the real time media flow by performing a process comprising:

obtaining a plurality of bandwidth values, each bandwidth value indicating an available bandwidth for a network segment of the determined network flow path; and determining the minimum of said plurality of bandwidth values.

9. The NIS of claim 5, wherein the NIS is further configured to determine a probability of packet loss for the first network segment.

10. The NIS of claim 9, wherein the NIS is further configured to determine, using said determined probability of packet loss for the first network segment, a combined probability of packet loss for the real time media flow.

11. The NIS of claim 1, wherein the transport condition is an estimated load experienced in at least one of: a cell in a communications network, a data link, a radio link, and a radio bearer through which the network connected device receives packets of the real time media flow.

12. The NIS of claim 1, wherein the transport condition comprises a recommendation for a transmission parameter to be used during transmission of the real time media flow.

13. The NIS of claim 12, wherein the transmission parameter is one of: a bandwidth, a burst-size, a packet size, and a redundancy parameter.

14. The NIS of claim 1, wherein the data transport node is a network node of a radio access network, the network node being one of: a base station and a radio network controller.

15. A method for providing transport condition information to a media sender, the method comprising:

acquiring monitoring data from a data transport node, wherein the monitoring data comprises information related to an available capacity associated with a real time media flow, and the data transport node is configured to relay packets of the real time media flow to an application layer of a network connected device;

using the acquired monitoring data to determine a transport condition; and transmitting to a media sender of the real time media flow a message comprising information indicating the determined transport condition.

16. The method of claim 15, wherein the media sender of the real time media flow controls a bitrate of the real time media flow.

17. The method of claim 15, further comprising receiving an event notification request transmitted by the media sender.

18. The method of claim 17, wherein the network connected device is endpoint of the real time media flow, and the event notification request comprises a first endpoint identifier for identifying the network connected device.

19. The method of claim 18, further comprising using the first endpoint identifier to determine a network flow path for the real time media flow, wherein the network flow path comprises a first network segment having an available bandwidth.

20. The method of claim 19, further comprising:

determining the available bandwidth for the first network segment, and determining, based on the available bandwidth for the first network segment, an available bandwidth for the real time media flow.

21. The method of claim 20, further comprising:

determining a difference between a) the determined available bandwidth for the real time media flow and b) a previously determined available bandwidth for the real time media flow, comparing the determined difference to a threshold to determine whether the determined difference meets a threshold condition, and transmitting to the media sender an event notification message as a result of determining that the determined difference meets the threshold condition, wherein the event notification message comprises information indicating the determined available bandwidth.

22. The method of claim 21, wherein the step of determining an available bandwidth for the real time media flow comprises:

obtaining a plurality of bandwidth values, each bandwidth value indicating an available bandwidth for a network segment of the determined network flow path; and determining the minimum of said plurality of bandwidth values.

23. The method of claim 19, further comprising determining a probability of packet loss for the first network segment.

24. The method of claim 23, further comprising determine, using said determined probability of packet loss for the first network segment, a combined probability of packet loss for the real time media flow.

25. The method of claim 15, wherein the transport condition is an estimated load experienced in at least one of: a cell in a communications network, a data link, a radio link, and a radio bearer through which the network connected device receives packets of the real time media flow.

26. The method of claim 15, wherein the transport condition comprises a recommendation for a transmission parameter to be used during transmission of the real time media flow.

27. The method of claim 26, wherein the transmission parameter is one of: a bandwidth, a burst-size, a packet size, and a redundancy parameter.

28. The method of claim 15, wherein the data transport node is a network node of a radio access network, the network node being one of: a base station and a radio network controller.

29. A non-transitory computer-readable medium storing a computer program for determining transport conditions in a communications network, the computer program comprising computer program code which, when run on a network information system (NIS) causes the NIS to perform the method of claim 15.

* * * * *